(12) United States Patent
Kim et al.

(10) Patent No.: US 11,361,904 B2
(45) Date of Patent: Jun. 14, 2022

(54) MULTILAYER ELECTRONIC COMPONENT

(71) Applicant: SAMSUNG ELECTRO-MECHANICS CO., LTD., Suwon-si (KR)

(72) Inventors: Je Jung Kim, Suwon-si (KR); Seung Ryeol Lee, Suwon-si (KR); Ji Won Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 60 days.

(21) Appl. No.: 16/864,695

(22) Filed: May 1, 2020

(65) Prior Publication Data
US 2021/0065988 A1 Mar. 4, 2021

(30) Foreign Application Priority Data
Aug. 28, 2019 (KR) .................. 10-2019-0105649

(51) Int. Cl.
| | |
|---|---|
| *H01G 4/30* | (2006.01) |
| *H01G 4/012* | (2006.01) |
| *H01G 2/06* | (2006.01) |
| *H01G 4/008* | (2006.01) |
| *H01G 4/12* | (2006.01) |

(52) U.S. Cl.
CPC ............... *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC ............ H01G 4/30; H01G 4/12; H01G 4/248; H01G 4/012; H01G 4/1209; H01G 4/232; H01G 4/0085; H01G 4/1227; H01G 4/2325
See application file for complete search history.

(56) References Cited

U.S. PATENT DOCUMENTS

| | | | | |
|---|---|---|---|---|
| 2004/0213901 | A1* | 10/2004 | Miki .................. | C03C 8/18 427/79 |
| 2014/0085767 | A1* | 3/2014 | Kang .................. | H01G 4/30 361/301.4 |
| 2014/0204502 | A1* | 7/2014 | Chun .................. | H01G 4/2325 361/301.4 |
| 2016/0233027 | A1 | 8/2016 | Iijima et al. | |
| 2016/0268047 | A1* | 9/2016 | Shin .................. | H01G 4/232 |
| 2018/0075970 | A1* | 3/2018 | Sato .................. | H01G 4/224 |
| 2018/0182550 | A1* | 6/2018 | Sasaki .................. | H01G 4/224 |

FOREIGN PATENT DOCUMENTS

| | | |
|---|---|---|
| KR | 10-2013-0061260 A | 6/2013 |
| KR | 10-2016-0068642 A | 6/2016 |
| KR | 10-2016-0108905 A | 9/2016 |

\* cited by examiner

*Primary Examiner* — Michael P McFadden
(74) *Attorney, Agent, or Firm* — Morgan, Lewis & Bockius LLP

(57) ABSTRACT

A multilayer electronic component includes a body, a protrusion disposed on at least one surface of the body, and an external electrode having an electrode layer disposed on a side surface of the body and extending to be in contact with a side surface of the protrusion and a conductive resin layer disposed on the electrode layer and extending to cover a portion of the protrusion.

20 Claims, 6 Drawing Sheets

'A'

II-II'

MULTILAYER ELECTRONIC COMPONENT

CROSS-REFERENCE TO RELATED APPLICATION(S)

The present application claims the benefit of priority to Korean Patent Application No. 10-2019-0105649 filed on Aug. 28, 2019 in the Korean Intellectual Property Office, the entire disclosure of which is incorporated herein by reference for all purposes.

BACKGROUND

1. Field

The present disclosure relates to a multilayer electronic component.

2. Description of Related Art

A multilayer ceramic capacitor (MLCC), a type of multilayer electronic component, may be a chip type capacitor mounted on a printed circuit board of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacitance, and relative ease of mounting. As various electronic devices such as computers, mobile devices, and the like are miniaturized and increased in terms of output, demand for miniaturization and high capacitance of multilayer ceramic capacitors are increasing.

In addition, as recent interest in electric/electronic vehicle components has increased, multilayer ceramic capacitors have also come to require relatively high reliability and strength characteristics to be used in vehicle or infotainment systems.

In order to secure high-reliability and high-strength characteristics, a method of changing a conventional external electrode, including an electrode layer, to have a double-layer structure including an electrode layer and a conductive resin layer has been proposed. In the double-layer structure including the electrode layer and the conductive resin layer, a resin composition, including a conductive material, is applied to the electrode layer to absorb external impacts and to prevent the permeation of plating liquid. As a result, reliability may be improved.

However, since standards for high-reliability and high-strength characteristics required by the industry are becoming higher, there is increasing demand for a method of further improving the high-reliability and high-strength characteristics.

SUMMARY

An aspect of the present disclosure is to improve adhesive strength of an electrode layer.

An aspect of the present disclosure is to easily control a shape of an electrode layer.

An aspect of the present disclosure is to improve humidity-resistance reliability.

However, the objects of the present disclosure are not limited to the above description, and will be more easily understood in the process of describing specific embodiments of the present disclosure.

According to an aspect of the present disclosure, a multilayer electronic component includes a body including dielectric layers, and first and second internal electrode layers alternately stacked with respective dielectric layers interposed therebetween, and having first and second surfaces opposing each other in a stacking direction of the dielectric layers, third and fourth surfaces connected to the first and second surfaces and opposing each other in a length direction of the body, and fifth and sixth surfaces connected to the first to fourth surfaces and opposing each other in a width direction of the body; a protrusion disposed on at least one of the first, second, fifth, and sixth surfaces and spaced apart from the third and fourth surfaces; a first external electrode including a first electrode layer, disposed on the third surface and extending to be in contact with a first side surface of the protrusion with respect to the length direction, and a first conductive resin layer disposed on the first electrode layer and extending to cover a portion of the protrusion, and a second external electrode including a second electrode layer, disposed on the fourth surface and extending to cover a second side surface of the protrusion with respect to the length direction, and a second conductive resin layer disposed on the second electrode layer and extending to cover a portion of the protrusion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
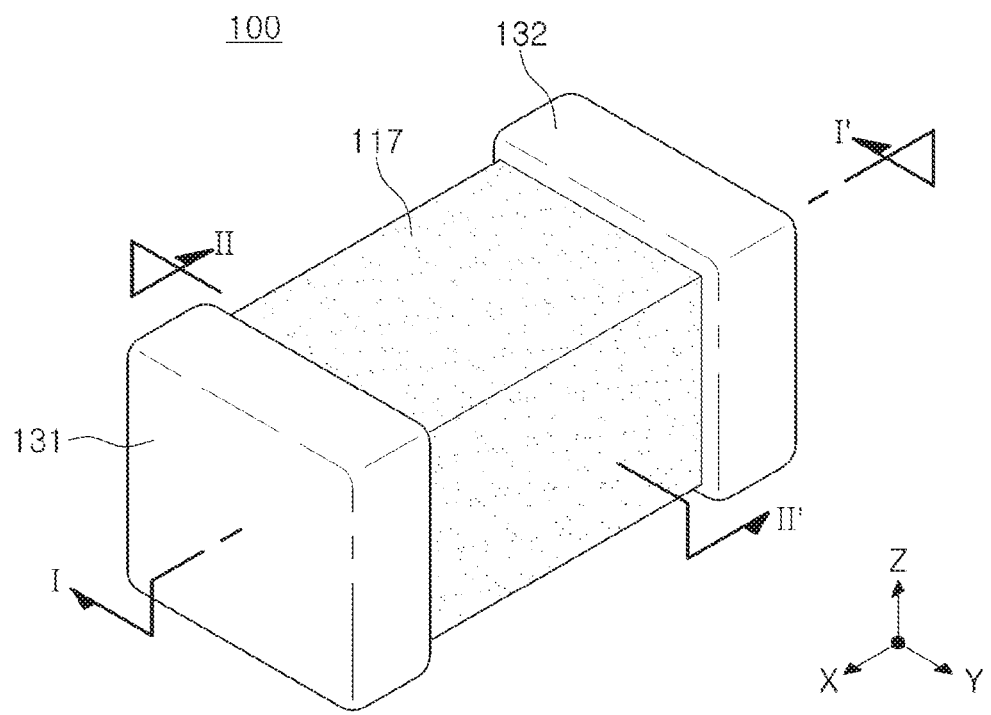
FIG. 1 is a schematic perspective view of a multilayer electronic component according to an exemplary embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinarily skilled artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawing, an X direction may be defined as an L direction or a length direction, a Y direction may be defined as a W direction or a width direction, and a Z direction may be defined as a stacking direction, a T direction, or a thickness direction.

Multilayer Electronic Component

FIG. 1 is a schematic perspective view of a multilayer electronic component according to an exemplary embodiment.

Figure 2:
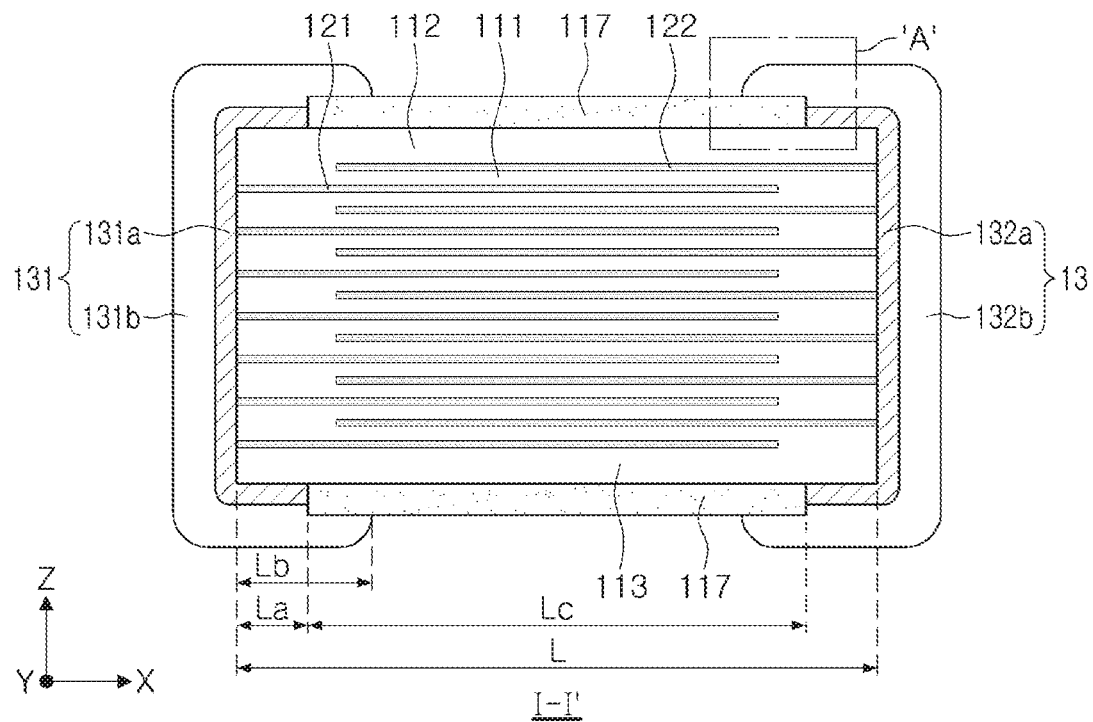
FIG. 2 is a cross-sectional view taken along line I-I' in FIG. 1.

FIG. 2 is a cross-sectional view taken along line I-I' in FIG. 1.

Figure 3:
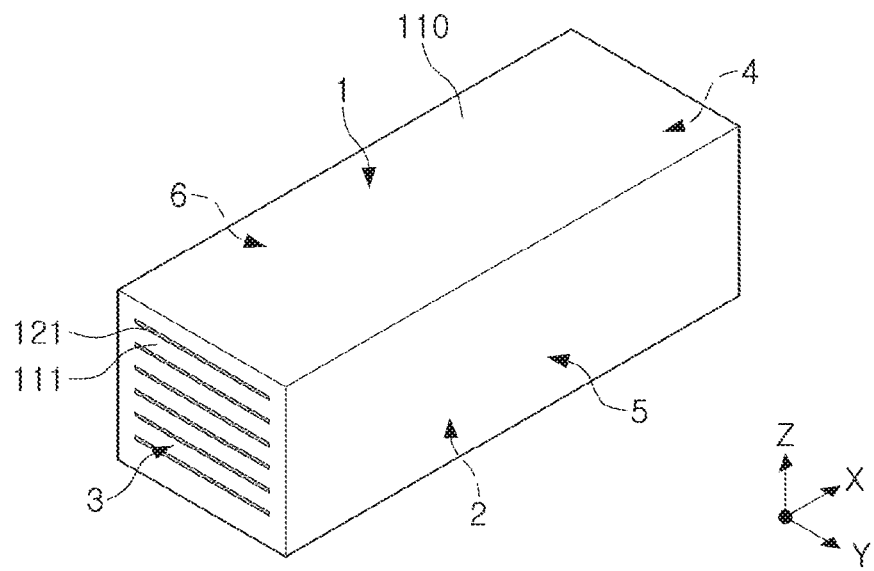
FIG. 3 is a schematic perspective view of a body in FIG. 1.

FIG. 3 is a schematic perspective view of a body in FIG. 1.

Figure 4:
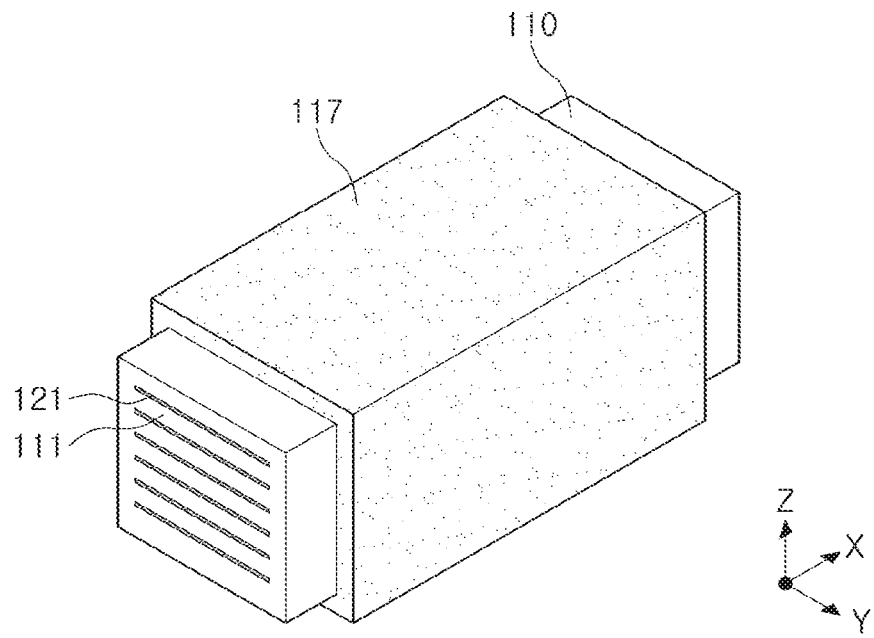
FIG. 4 is a schematic perspective view of a body and a protrusion in FIG. 1.

FIG. 4 is a schematic perspective view of a body and a protrusion in FIG. 1.

Figure 5:
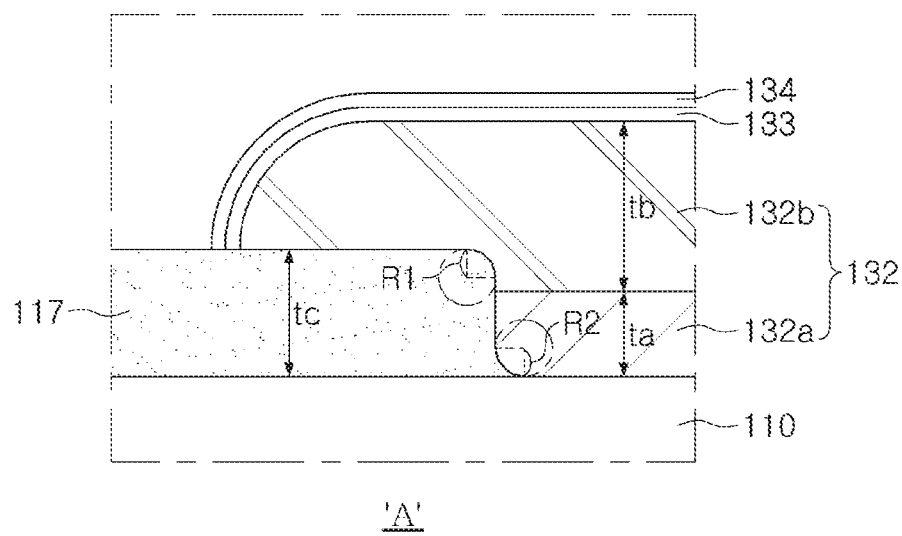
FIG. 5 is an enlarged view of region 'A' in FIG. 2.

FIG. 5 is an enlarged view of region 'A' in FIG. 2.

Figure 6:
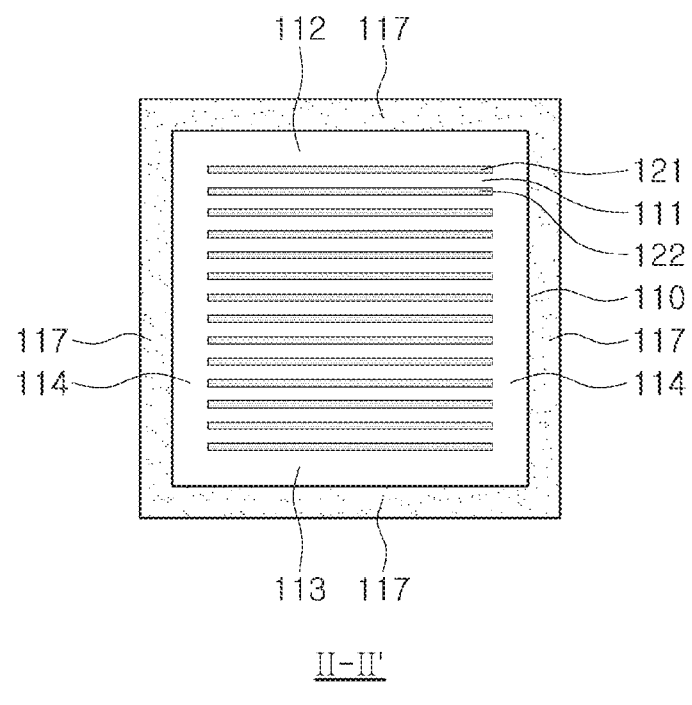
FIG. 6 is a cross-sectional view taken along line II-II' in FIG. 1.

FIG. 6 is a cross-sectional view taken along line II-II' in FIG. 1.

Hereinafter, a multilayer electronic component according to an exemplary embodiment will be described with reference to FIGS. 1 to 6.

A multilayer electronic component 100 according to an exemplary embodiment may include a body 110 including dielectric layers 111, and first and second internal electrodes 121 and 122 alternately stacked with respective dielectric layers interposed therebetween, and having first and second surfaces 1 and 2 opposing each other in a stacking direction (e.g., a Z direction) of the dielectric layers 111, third and fourth surfaces 3 and 4 connected to the first and second surfaces 1 and 2 and opposing each other, and fifth and sixth surfaces 5 and 6 connected to the first to fourth surfaces 1, 2, 3, and 4 and opposing each other, a protrusion 117 disposed on at least one of the first, second, fifth, and sixth surfaces 1, 2, 5, and 6 and spaced apart from the third and fourth surfaces 3 and 4, a first external electrode 131 including a first electrode layer 131a disposed on the third surface 3 and extending to be in contact with one side surface of the protrusion 117 and a first conductive resin layer 131b disposed on the first electrode layer 131a and extending to cover a portion of the protrusion 117, and a second external electrode 132 including a second electrode layer 132a disposed on the fourth surface 4 and extending to cover the other side surface of the protrusion 117 and a second conductive resin layer 132b disposed on the second electrode layer 132a and extending to a portion of the protrusion 117.

In the body 110, the dielectric layers 111 and the internal electrodes 121 and 122 are alternately stacked.

The body 110 is not limited in shape, but may have a hexahedral shape or a shape similar thereto. Due to shrinkage of ceramic powder particles included in the body 110 during sintering, the body 110 may have a substantially hexahedral shape rather than a hexahedral shape having complete straight lines.

The body 110 may have the first and second surfaces 1 and 2 opposing each other in a thickness direction (e.g., the Z direction) of the body 110, the third and fourth surfaces 3 and 4 connected to the first and second surfaces 1 and 2 and opposing each other in a length direction (e.g., an X direction) of the body 110, and the fifth and sixth surfaces 5 and 6 connected to the first and second surfaces 1 and 2 and as well as to the third and fourth surfaces 3 and 4 and opposing each other in a width direction (e.g., a Y direction) of the body 110.

The plurality of dielectric layers 111, constituting the body 110, is in a sintered state and may be integrated with each other such that boundaries therebetween may not be readily apparent without using a scanning electron microscope (SEM).

According to an exemplary embodiment, a raw material forming the dielectric layer 111 is not limited as long as sufficient capacitance may be obtained. For example, a barium titanate-based material, a lead composite perovskite-based material, a strontium titanate-based material, or the like, may be used.

Various ceramic additives, organic solvents, plasticizers, binders, dispersants, or the like may be added to the powder of barium titanate ($BaTiO_3$), and the like, according to the purpose of the present disclosure, as the material for forming the dielectric layer 111.

The body 110 may include a capacitance forming portion disposed in the body 110 and including the first and second internal electrodes 121 and 122, disposed to oppose each other with the dielectric layer 111 interposed therebetween, to form capacitance, an upper cover portion 112 disposed above the capacitance forming portion, and a lower cover portion 113 disposed below the capacitance forming portion. The body 110 may further include a side margin portion 114 defined between the fifth surface 5 (and/or the sixth surface 6) of the body 110 and the internal electrodes 121 and 122.

The capacitance forming portion may contribute to capacitance formation of a capacitor, and may be formed by repeatedly laminating the plurality of first and second internal electrodes 121 and 122 with the dielectric layer 111 interposed therebetween.

The upper cover portion 112 and the lower cover portion 113 may be formed by laminating a single dielectric layer or two or more dielectric layers on upper and lower surfaces of the capacitance forming portion, respectively, in the vertical direction, and may basically play a role in preventing damage to the internal electrodes due to physical or chemical stress.

The upper cover portion 112 and the lower cover portion 113 may not include an internal electrode, and may include the same material as the dielectric layer 111.

The plurality of internal electrodes 121 and 122 may be disposed to oppose each other with the dielectric layer 111 interposed therebetween.

The internal electrodes 121 and 122 may include first and second internal electrodes 121 and 122 alternately disposed to oppose each other with respective dielectric layers interposed therebetween.

The first and second internal electrodes 121 and 122 may be exposed to the third and fourth surfaces 3 and 4, respectively.

Referring to FIGS. 2 to 4, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 to be connected to the first internal electrode 121, and the second external electrode 132 may be disposed on the fourth surface 4 of the body 110 to be connected to the internal electrode 122.

The first and second internal electrodes 121 and 122 may be electrically separated from each other by the dielectric layer 111 disposed therebetween.

The body 110 may be formed by alternately laminating the dielectric layer 111, on which the first internal electrode 121 is printed, and the dielectric layer 111, on which the second internal electrode 122 is printed, in a thickness direction (e.g., a Z direction) and sintering the dielectric layers 111 and 122.

The material forming the first and second internal electrodes 121 and 122 is not limited. For example, the first and second internal electrodes 121 and 122 may be formed using a conductive paste containing a noble metal material such as palladium (Pd), a palladium-silver (Pd—Ag) alloy, or the like, nickel (Ni), and copper (Cu).

A method of printing the conductive paste may be a screen-printing method, a gravure printing method, or the like, but is not limited thereto.

The protrusion 117 is disposed on one or more of the first, second, fifth and sixth surface 1, 2, 5, and 6, and is spaced apart from the third and fourth surface 3 and 4.

The first external electrode 131 is disposed on the third surface 3 and includes a first electrode layer 131a, extending to be in contact with one side surface of the protrusion 117, and a first conductive resin layer 131b disposed on the first electrode layer 131a and extending to cover a portion of the protrusion 117.

The second external electrode 132 is disposed on the fourth surface 4 and includes a second electrode layer 132a, extending to be in contact with the other side surface of the protrusion 117, and a second conductive resin layer 132b disposed on the second electrode layer 132a and extending to cover a portion of the protrusion 117.

The first and second external electrodes 131 and 132 may be electrically connected to the first and second internal electrodes 121 and 122, respectively, to form capacitance. The second external electrode 132 may be connected to a potential different from a potential to which the first external electrode 131 is connected.

Referring to FIG. 2, since the first electrode layer 131a is in contact with one side surface of the protrusion 117 and the second electrode layer 132a is in contact with the other side surface of the protrusion 117, a length La of the first electrode layer 131a on one surface or the second surface of the body 110, a length Lc of the protrusion 117, and a length of the second electrode layer 132a may be added up to be the same as a length L of the body 110.

In addition, since the length Lb of the first conductive resin layer 131b is longer than the length La of the first electrode layer 131a on the first surface or the second surface, the first conductive resin layer 131b may have a shape covering a portion of the protrusion 117.

The protrusion 117 may serve to easily control a length and a shape of an electrode layer.

In general, the electrode layers 131a and 132a may be formed using a paste, including a conductive metal, and by a method of dipping an exposed surface, to which an internal electrode of the body is exposed, into the paste. However, it may be difficult to control the length and shape of the electrode layers 131a and 132a, due to a mooning phenomenon in which the paste rises up the surface of the body 110.

According to an exemplary embodiment, the protrusion 117 may be disposed on at least one of the first, second, fifth and sixth surfaces 1, 2, 5, and 6 and spaced apart from the third and fourth surfaces 3 and 4, such that the protrusion 117 may serve as barriers during formation of the electrode layers 131a and 132a to easily control the length and shape of the electrode layers 131a and 132a.

In addition, the protrusion 117 may serve to improve adhesive strength of the electrode layers 131a and 132a.

The first electrode layer 131a is in contact with one side of the protrusion 117 and the second electrode layer 132a is in contact with the other side of the protrusion 117, securing higher fixing strength than when the electrode layers 131a and 132a are only in contact with the body 110.

Accordingly, peel-off of the electrode layers 131a and 132a, caused by external force generated during use of the multilayer electronic component 100, may be prevented. In addition, reduction of insulation resistance (IR) or occurrence of a short-circuit may be suppressed and bending strength may be improved.

Furthermore, the protrusion 117 may serve to improve humidity resistance reliability.

According to an exemplary embodiment, since the electrode layers 131a and 132a are in contact with a side surface of the protrusion 117 and the conductive resin layers 131b and 132b cover the protrusion 117, a humidity permeation path is increased in length and is complicated. Therefore, permeation of a plating liquid may be suppressed during plating to improve humidity resistance reliability.

Referring to FIG. 5, the protrusion 117 may have a thickness tc of 30 µm or more to 100 µm or less.

When the thickness tc of the protrusion 117 is less than 30 µm, it may be difficult for the protrusion 117 to sufficiently serve as a barrier. When the thickness tc of the protrusion 117 is greater than 100 µm, capacitance per unit volume may be reduced.

Each of the first and second electrode layers 131a and 132a may have a thickness ta less than or equal to the thickness tc of the protrusion 117. Accordingly, the humidity permeation path may be complicated to improve the humidity resistance reliability.

In addition, when the thickness ta of each of the first and second electrode layers 131a and 132a is greater than the thickness tc of the protrusion 117, it may be difficult to control a length and a shape of each of the electrode layers 131a and 132a a due to a mooning phenomenon, in which the paste rises up the surface of the body 110, or the like.

In more detail, the thickness ta of each of the first and second electrode layers 131a and 132a may be less than or equal to 90% of the thickness tc of the protrusion 117 such that the humidity permeation path may be further complicated.

The thickness ta of each of the first and second electrode layers 131a and 132a may be 20% or more of the thickness tc of the protrusion 117.

This is because when the thickness ta of each of the first and second electrode layers 131a and 132a is less than 20% of the thickness tc of the protrusion 117, areas of the first and second electrode layers 131a and 132b, disposed to be in contact with the side surface of the protrusion 117, are too small to secure sufficient adhesive strength.

Referring to FIG. 2, the length Lc of the protrusion 117 may be 80% or less of the length L of the body 110.

When the length Lc of the protrusion 117 is greater than 80% of the length L of the body 110, spaced distances between the protrusion 117 the third and fourth surfaces 3 and 4 of the body are too short. Therefore, a humidity permeation path may be shortened, or the adhesive strength of the electrode layers 131a and 132a may be reduced. As a result, reliability may be deteriorated.

The lower limit of the length Lc of the protrusion 117 does not need to be limited, but the length Lc of the protrusion 117 may be 40% or more of the length L of the body to prevent the first and second conductive resin layers 131b and 132b, covering the protrusion 117, from being connected to each other and short-circuited.

Referring to FIG. 5, to prevent concentration of stress, a first corner edge of the protrusion 117, covered by the first and second conductive resin layers 131b and 132b, may have a rounded shape, and a second corner edge of the protrusion 117, defined by the first and second side surfaces of the protrusion 117 and a surface of the body 110, may have a rounded shape.

When the first corner edge or the second corner edge of the protrusion 117 is angled, stress concentration may occur and cause cracking.

When a radius of the first corner edge of the protrusion 117 is defined as R1 and a radius of the second corner edge of the protrusion 117 is defined as R2, each of R1 and R2 may be 10 to 30% of the thickness tc of the protrusion 117.

When R1 or R2 is less than 10% of the thickness tc of protrusion 117, an effect of suppressing the concentration of stress may be insufficient. When R1 or R2 is greater than 30% of the thickness tc of protrusion 117, it may be difficult for the protrusion 117 to serve as a barrier.

Referring to FIG. 6, the protrusion 117 may be disposed on the first, second, fifth, and sixth surfaces 1, 2, 5, and 6 of the body 110 and may be spaced apart from third and fourth surfaces 3 and 4 of the body 110. As the protrusion 117 is disposed on all of the first, second, fifth, and sixth surfaces 1, 2, 5, and 6 of the body 110, a length and a shape of each of the electrode layers 131a and 132a may be more easily controlled, and adhesive strength of the electrode layers 131a and 132a may be further improved.

Figure 7:
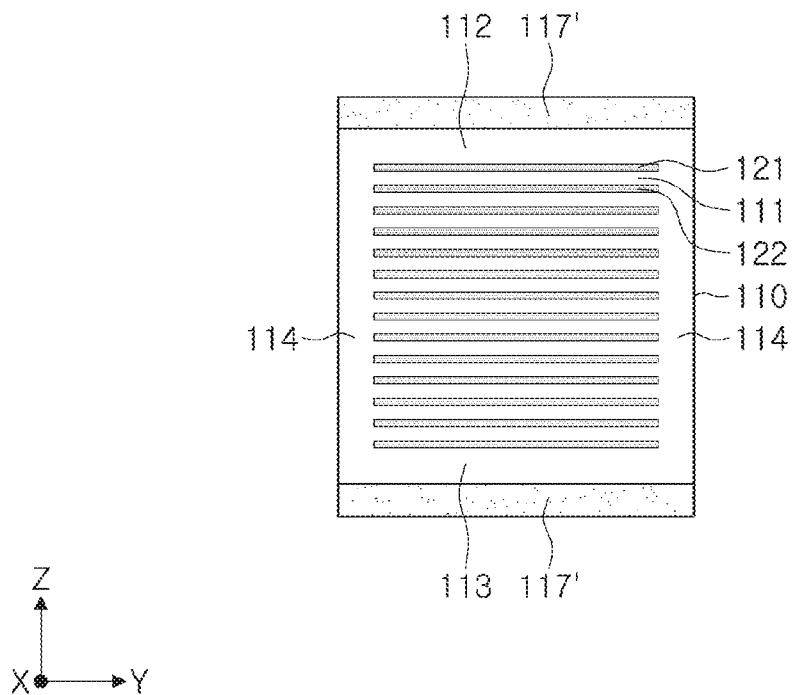
FIG. 7 is a W-T cross-sectional view according to a first modified exemplary embodiment.

However, the present disclosure is not limited to the case in which the protrusion 117 is disposed on all of the first, second, fifth, and sixth surfaces 1, 2, 5, and 6 of the body 110. As illustrated in FIG. 7, a W-T cross-sectional view according to a first modified exemplary embodiment, a protrusion 117' may be disposed only on the first and second surfaces 1 and 2 of the body 110.

Figure 8:
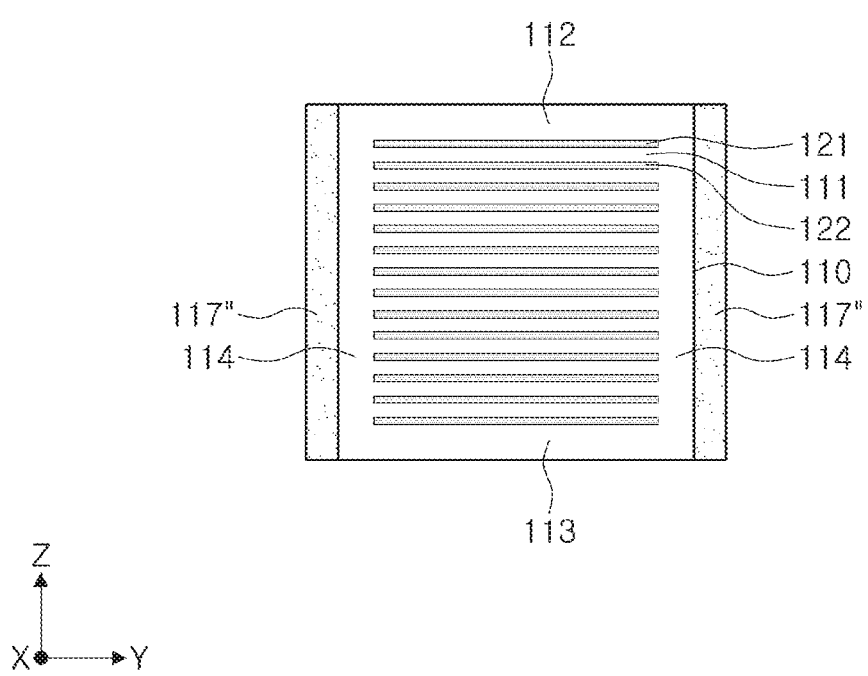
FIG. 8 is a W-T cross-sectional view according to a second modified exemplary embodiment.

In addition, as illustrated in FIG. 8, a W-T cross-sectional view according to a second modified exemplary embodiment, a protrusion 117" may be disposed only on the fifth and sixth surfaces 5 and 6 of the body 110.

Figure 9:
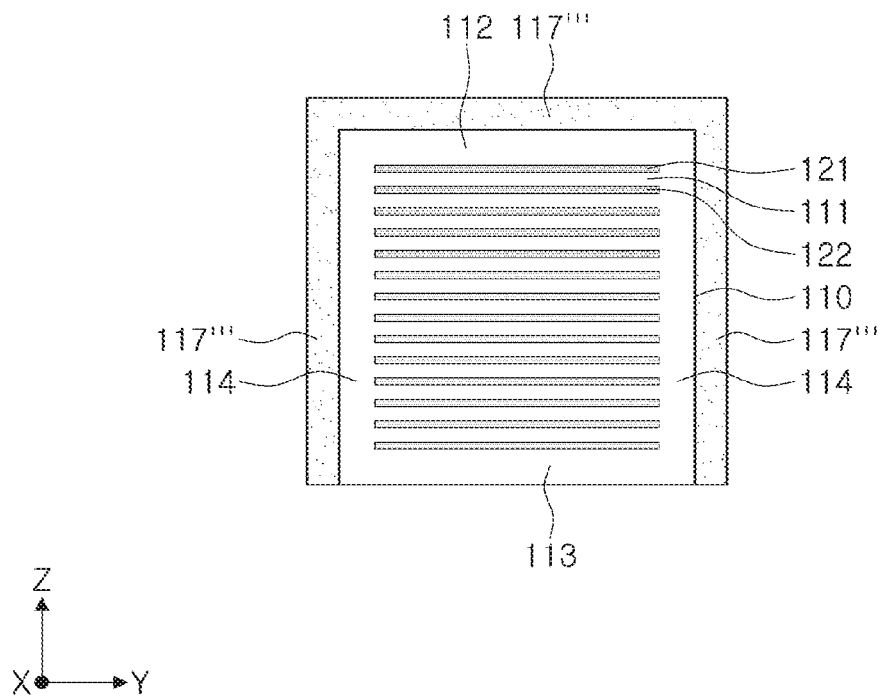
FIG. 9 is a W-T cross-sectional view according to a third modified exemplary embodiment.

In addition, as illustrated in FIG. 9, a W-T cross-sectional view according to a third modified exemplary embodiment, a protrusion 117''' may be disposed only on the first, fifth, and sixth surfaces 1, 5, and 6 of the body 110.

Figure 10:
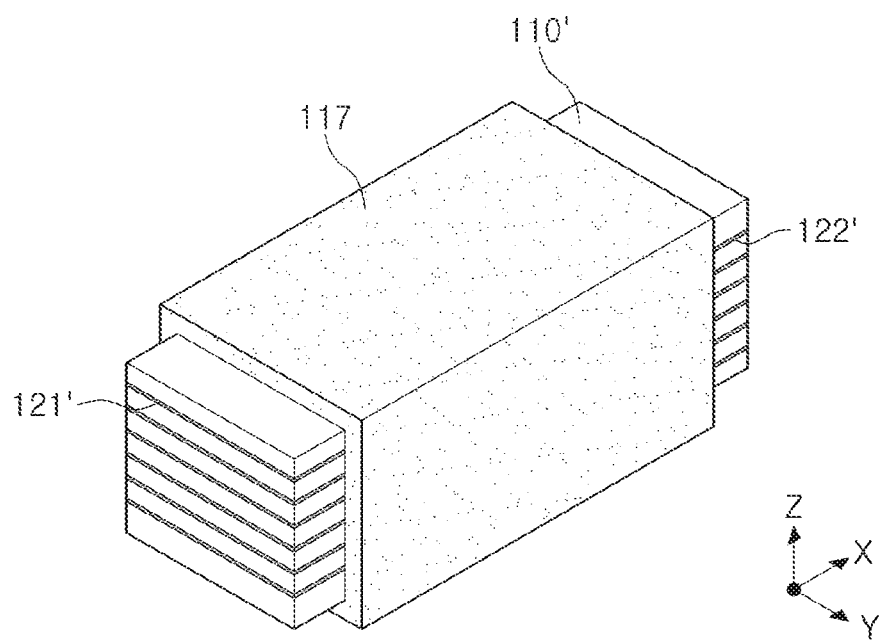
FIG. 10 is a schematic perspective view of a body and a protrusion according to a fourth modified exemplary embodiment.

Referring to FIG. 10, a schematic perspective view of a body 110' and a protrusion 117 according to a fourth modified exemplary embodiment, the protrusion 117 may be disposed on first, second, fifth, and sixth surfaces 1, 2, 5, and 6 of the body 110' and may be spaced apart from third and fourth 3 and 4 surfaces of the body 110, a first internal electrode 121' may be spaced apart from the fourth surface 4 of the body 110' and may be exposed through the third, fifth, and sixth surfaces 3, 5, and 6 of the body 110', and a second internal electrode 122' may be spaced apart from the third surface 3 of the body 110' and may be exposed through the fourth, fifth, and sixth surfaces 4, 5, and 6 of the body 110'.

Accordingly, a first overlapping area between the first internal electrode 121' and the second internal electrode 122' may be significantly reduced, and the first and second internal electrodes 121' and 122', exposed to the fifth and sixth surfaces 5 and 6 of the body 110', may be protected from an outside of a multilayer capacitor component covered with the protrusion 117 and the electrode layers 131a and 132a.

As a result, capacitance per unit volume may be improved while maintaining an effect of controlling the length and shape of the electrode layers 131a and 132a, an effect of improving adhesive strength, and an effect of improving humidity resistance reliability due to the protrusion 117.

A material forming the protrusion 117 may be an insulating material, capable of being bonded to the body 110, but is not limited to a specific material. For example, the protrusion 117 may include the same material as a dielectric layer 111.

In addition, a method of forming the protrusion 117 is not limited to a specific method. For example, the protrusion 117 may be formed by printing a ceramic paste, or the protrusion 117 may be formed by transferring a ceramic sheet.

The electrode layers 131a and 132a may include a conductive metal and glass.

A conductive metal, used for the electrode layers 131a and 132a, is not limited as long as it may be electrically connected to the internal electrode to form capacitance and may include at least one selected from the group consisting of, for example, copper (Cu), silver (Ag), nickel (Ni), and alloys thereof.

The electrode layers 131a and 132a may be formed by applying a conductive paste, prepared by adding a glass frit, to the conductive metal powder particles and sintering baking the conductive paste.

The conductive resin layers 131b and 132b may include a conductive metal and a base resin.

The conductive metal, included in the conductive resin layers 131b and 132b, serves to electrically connect the conductive resin layers 131b and 132b to the electrode layers 131a and 132a.

The conductive metal, included in the conductive resin layers 131b and 132b, is not limited as long as it may be electrically connected to the electrode layers 131a and 132a and may include at least one selected from the group consisting of, for example, copper (Cu), silver (Ag), nickel (Ni), and alloys thereof.

The conductive metal, included in the conductive resin layers 131b and 132b, may include at least one of spherical powder particles and flake powder particles. For example, the conductive metal may include only flake powder particles, or spherical powder particles, or a mixture of flake powder particles and spherical powder particles.

The spherical powder particles may have an incompletely spherical shape and may have, for example, a shape in which a ratio of a length of a major axis to a length of a minor axis (the major axis/the minor axis) is 1.45 or less.

The flake powder particles refer to powder particles, each having a flat and elongated shape, and is not limited to a specific shape and, for example, a ratio of a length of a major axis and a length of a minor axis (the major axis/the minor axis) may be 1.95 or more.

The lengths of the major axes and the minor axes of the spherical powder particles and the flake powder particles may be measured from an image obtained by scanning a cross section (an L-T cross section), taken from a central portion of a multilayer electronic component in a width (Y) direction, in X and Z directions with a scanning electron microscope (SEM).

The base resin, included in the conductive resin layers 131b and 132b, serves to secure adhesion and to absorb impact.

The base resin, included in the conductive resin layers 131b and 132b, is not limited as long as it has adhesion and impact absorption and is mixed with conductive metal powder particles to prepare a paste and may include, for example, an epoxy-based resin.

The external electrodes 131 and 132 may further include plating layers 133 and 134 disposed on the conductive resin layers 131b and 132b to improve mounting characteristics.

For example, the plating layer may be a nickel (Ni) plating layer 133 or a tin (Sn) plating layer 134, may have a structure in which the Ni plating layer 133 and the Sn plating layer 134 may be sequentially formed on the conductive resin layers 131b and 132b, and may include a plurality of Ni plating layers and/or a plurality Sn plating layer.

Figure 11:
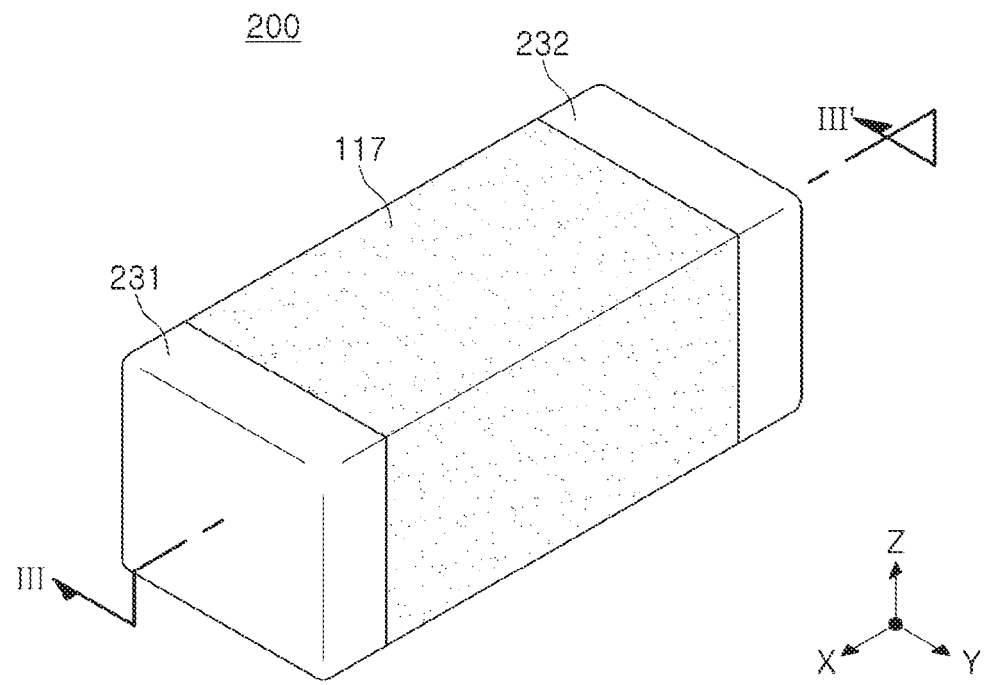
FIG. 11 is a schematic perspective view of a multilayer electronic component according to another exemplary embodiment of the present disclosure.
Figure 12:
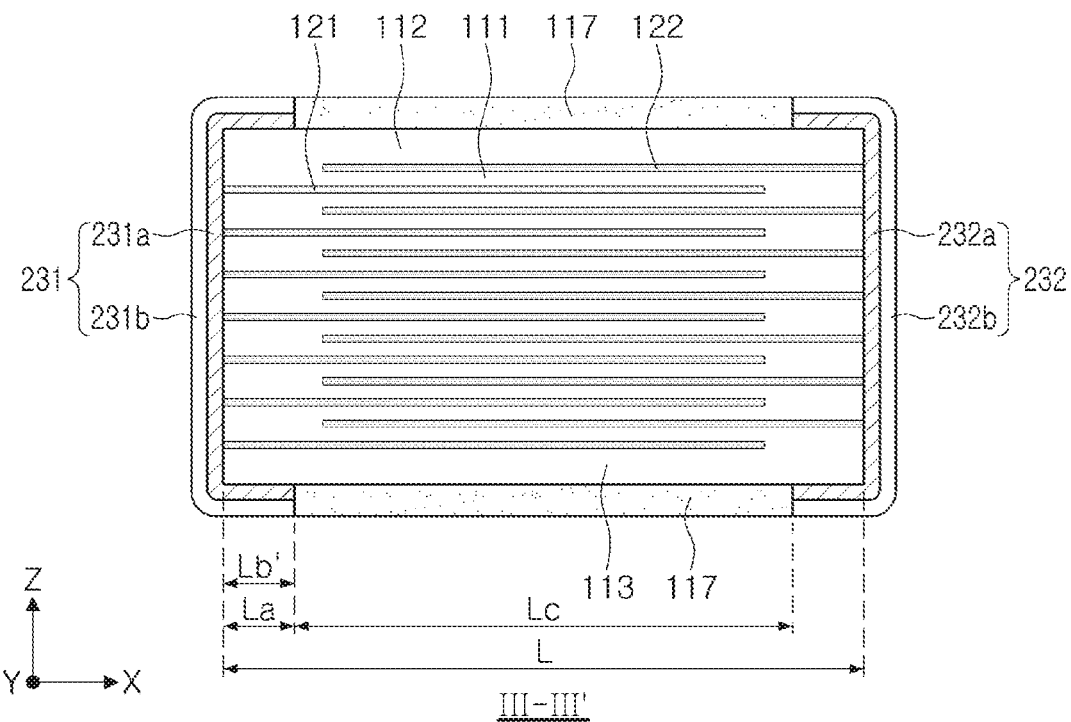
FIG. 12 is a cross-sectional view taken along line in FIG. 11.

FIG. 11 is a schematic perspective view of a multilayer electronic component according to another exemplary embodiment of the present disclosure. FIG. 12 is a cross-sectional view taken along line in FIG. 11.

Referring to FIGS. 11 and 12, a multilayer electronic component 200 according to another another exemplary embodiment of the present disclosure includes a body 110 including dielectric layers 111, and first and second internal electrode layers 121 and 122 alternately stacked with respective dielectric layers interposed therebetween, and having first and second surfaces opposing each other in a stacking direction of the dielectric layers 111, third and fourth surfaces connected to the first and second surfaces and opposing each other in a length direction of the body, and fifth and sixth surfaces connected to the first to fourth surfaces and opposing each other in a width direction of the body, a protrusion 117 disposed on at least one of the first, second, fifth, and sixth surfaces and spaced apart from the third and fourth surfaces in the length direction, a first external electrode 231 including a first electrode layer 231a disposed on the third surface and a first conductive resin layer 231b disposed on the first electrode layer 231a, and a second external electrode 232 including a second electrode layer 232a disposed on the fourth surface and a second conductive resin layer 232b disposed on the second electrode layer 232a.

The first electrode layer 231a and the first conductive resin layer 232a extend to be in contact with a first side surface of the protrusion 117 with respect to the length direction. The second electrode layer 232a and the second conductive resin layer 232b extend to be in contact with a second side surface of the protrusion 117 with respect to the length direction. Therefore, adhesive strength of the electrode layer may be improved.

Referring to FIG. 12, the length Lb' of the first conductive resin layer 232b may be equal to the the length La of the first electrode layer 231a on the first surface or the second surface.

Since overall thickness of the first external electrode or the second external electrode may be less than a thickness of the protrusion, a capacitance per unit volume may be increased.

As described above, according exemplary embodiments of the present disclosure, a protrusion may be disposed on a body and an electrode layer is disposed on a side surface of the protrusion. Thus, adhesive strength of the electrode layer may be improved.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a body including dielectric layers, and first and second internal electrode layers alternately stacked with respective dielectric layers interposed therebetween, and having first and second surfaces opposing each other in a stacking direction of the dielectric layers, third and fourth surfaces connected to the first and second surfaces and opposing each other in a length direction of the body, and fifth and sixth surfaces connected to the first to fourth surfaces and opposing each other in a width direction of the body;
   a protrusion disposed on at least one of the first, second, fifth, and sixth surfaces and spaced apart from the third and fourth surfaces in the length direction;
   a first external electrode including a first electrode layer disposed on the third surface and extending to be in contact with a first side surface of the protrusion with respect to the length direction, the first external electrode further including a first conductive resin layer disposed on the first electrode layer and extending to cover a portion of the protrusion; and
   a second external electrode including a second electrode layer disposed on the fourth surface and extending to cover a second side surface of the protrusion with respect to the length direction, the second external electrode further including a second conductive resin layer disposed on the second electrode layer and extending to cover a portion of the protrusion,
   wherein at least one of the first or second electrode layer has a thickness less than a thickness of the protrusion.

2. The multilayer electronic component of claim 1, wherein the thickness of the protrusion ranges from 30 μm to 100 μm.

3. The multilayer electronic component of claim 1, wherein the thickness of each of the first and second electrode layers is less than the thickness of the protrusion.

4. The multilayer electronic component of claim 1, wherein the thickness of each of the first and second electrode layers is 20% or more of the thickness of the protrusion.

5. The multilayer electronic component of claim 1, wherein the thickness of each of the first and second electrode layers is less than or equal to 90% of the thickness of the protrusion.

6. The multilayer electronic component of claim 1, wherein the protrusion has a length less than or equal to 80% of a length of the body with respect to the length direction.

7. The multilayer electronic component of claim 1, wherein a first corner edge of the protrusion, covered by the first and second conductive resin layers, has a rounded shape, and
   a second corner edge of the protrusion, defined by the first and second side surfaces of the protrusion and a surface of the body, has a rounded shape.

8. The multilayer electronic component of claim 7, wherein each of R1 and R2 is 10 to 30% of the thickness of the protrusion, where a radius of the first corner edge of the protrusion is defined as R1 and a radius of the second corner edge of the protrusion is defined as R2.

9. The multilayer electronic component of claim 1, wherein the protrusion is disposed on the first, second, fifth, and sixth surfaces of the body.

10. The multilayer electronic component of claim 9, wherein the first internal electrode is spaced apart from the fourth surface of the body and is exposed through the third, fifth, and sixth surfaces of the body, and
the second internal electrode is spaced apart from the third surface of the body and is exposed through the fourth, fifth, and sixth surfaces of the body.

11. The multilayer electronic component of claim 1, wherein the protrusion is disposed only on the first and second surfaces of the body.

12. The multilayer electronic component of claim 1, wherein the protrusion is disposed only on the fifth and sixth surfaces of the body.

13. The multilayer electronic component of claim 1, wherein the protrusion is disposed only on the first, fifth and sixth surfaces of the body.

14. The multilayer electronic component of claim 1, wherein the protrusion includes the same material as the dielectric layer.

15. The multilayer electronic component of claim 1, wherein the first and second electrode layers include a conductive metal and glass.

16. The multilayer electronic component of claim 1, wherein the first and second conductive resin layers include a conductive metal and a base resin.

17. The multilayer electronic component of claim 1, further comprising:
at least one plating layer disposed on the first and second conductive resin layers.

18. A multilayer electronic component comprising:
a body including dielectric layers, and first and second internal electrode layers alternately stacked with respective dielectric layers interposed therebetween, and having first and second surfaces opposing each other in a stacking direction of the dielectric layers, third and fourth surfaces connected to the first and second surfaces and opposing each other in a length direction of the body, and fifth and sixth surfaces connected to the first to fourth surfaces and opposing each other in a width direction of the body;
a protrusion disposed on at least one of the first, second, fifth, and sixth surfaces and spaced apart from the third and fourth surfaces in the length direction;
a first external electrode including a first electrode layer disposed on the third surface and a first conductive resin layer disposed on the first electrode layer; and
a second external electrode including a second electrode layer disposed on the fourth surface and a second conductive resin layer disposed on the second electrode layer,
wherein the first electrode layer and the first conductive resin layer extend to be in contact with a first side surface of the protrusion with respect to the length direction, and
wherein the second electrode layer and the second conductive resin layer extend to be in contact with a second side surface of the protrusion with respect to the length direction.

19. The multilayer electronic component of claim 18, wherein an overall thickness of the first external electrode or the second external electrode is less than a thickness of the protrusion.

20. A multilayer electronic component comprising:
a body including dielectric layers, and first and second internal electrode layers alternately stacked with respective dielectric layers interposed therebetween, and having first and second surfaces opposing each other in a stacking direction of the dielectric layers, third and fourth surfaces connected to the first and second surfaces and opposing each other in a length direction of the body, and fifth and sixth surfaces connected to the first to fourth surfaces and opposing each other in a width direction of the body;
a protrusion disposed on at least one of the first, second, fifth, and sixth surfaces and spaced apart from the third and fourth surfaces in the length direction;
a first external electrode including a first electrode layer disposed on the third surface and extending to be in contact with a first side surface of the protrusion with respect to the length direction, the first external electrode further including a first conductive resin layer disposed on the first electrode layer and extending to cover a portion of the protrusion; and
a second external electrode including a second electrode layer disposed on the fourth surface and extending to cover a second side surface of the protrusion with respect to the length direction, the second external electrode further including a second conductive resin layer disposed on the second electrode layer and extending to cover a portion of the protrusion,
wherein a first corner edge of the protrusion, covered by the first and second conductive resin layers, has a rounded shape,
a second corner edge of the protrusion, defined by the first and second side surfaces of the protrusion and a surface of the body, has a rounded shape, and
each of R1 and R2 is 10 to 30% of a thickness of the protrusion, where a radius of the first corner edge of the protrusion is defined as R1 and a radius of the second corner edge of the protrusion is defined as R2.

* * * * *